(12) United States Patent
Lee

(10) Patent No.: US 7,804,556 B2
(45) Date of Patent: Sep. 28, 2010

(54) BACKLIGHT UNIT AND LIQUID CRYSTAL DISPLAY DEVICE HAVING THE SAME

(75) Inventor: Jae Ho Lee, Daegu (KR)

(73) Assignee: LG Display Co., Ltd., Seoul (KR)

( * ) Notice: Subject to any disclaimer, the term of this patent is extended or adjusted under 35 U.S.C. 154(b) by 221 days.

(21) Appl. No.: 12/149,932

(22) Filed: May 9, 2008

(65) Prior Publication Data
US 2008/0278660 A1 Nov. 13, 2008

(30) Foreign Application Priority Data
May 11, 2007 (KR) ........................ 10-2007-0045858

(51) Int. Cl.
G02F 1/1337 (2006.01)
F21V 23/00 (2006.01)
(52) U.S. Cl. ........................ 349/65; 349/39; 362/613
(58) Field of Classification Search .................. 349/65, 349/38, 56, 58, 62, 70, 71, 139, 149, 147, 349/158; 362/613
See application file for complete search history.

(56) References Cited

U.S. PATENT DOCUMENTS

| | | | | |
|---|---|---|---|---|
| 6,566,821 B2 * | 5/2003 | Nakatsuka et al. | ..... | 315/209 PZ |
| 7,452,102 B2 * | 11/2008 | Ryu | ........................... | 362/225 |
| 7,459,865 B2 * | 12/2008 | Honbo | ....................... | 315/291 |
| 2002/0141207 A1 * | 10/2002 | Van Den Braken | ........... | 363/34 |
| 2002/0190611 A1 * | 12/2002 | Nakatsuka et al. | .......... | 310/359 |
| 2006/0038466 A1 * | 2/2006 | Nakatsuka et al. | .......... | 310/359 |
| 2006/0103329 A1 * | 5/2006 | Maeda et al. | ............... | 315/277 |
| 2006/0208641 A1 * | 9/2006 | Maniwa et al. | .............. | 313/623 |
| 2008/0278660 A1 * | 11/2008 | Lee | .............................. | 349/65 |

FOREIGN PATENT DOCUMENTS

| | | | | |
|---|---|---|---|---|
| CN | 2747603 Y | 12/2005 | ................ | 349/70 X |
| CN | 1945786 A | 4/2007 | ................ | 349/70 X |

* cited by examiner

Primary Examiner—Brian M Healy
(74) Attorney, Agent, or Firm—Morgan Lewis & Bockius LLP

(57) ABSTRACT

Disclosed are a backlight unit and a liquid crystal display device having the same, capable of reducing tube current variation between light sources. The backlight unit includes a plurality of lamps provided at both ends thereof with electrodes and having a tubular shape, a plurality of lamp holders for fixing the both ends of the lamps, at least one substrate on which the lamp holders are mounted, and at least two conductors formed on the substrate in opposition to each other to generate capacitance for uniformly maintaining tube current of the lamps.

18 Claims, 4 Drawing Sheets

BACKLIGHT UNIT AND LIQUID CRYSTAL DISPLAY DEVICE HAVING THE SAME

The present application claims priority under 35 U.S.C. 119 and 35 U.S.C. 365 to Korean Patent Application No. 10-2007-0045858 (filed on May 11, 2007), which is hereby incorporated by reference in its entirety.

BACKGROUND OF INVENTION

1. Field of Invention

The present invention relates to a backlight unit. More particularly, the present invention relates to a backlight unit capable of reducing tube current variation between light sources, and a liquid crystal display device having the same.

2. Description of Related Art

Recently, with the development of semiconductor technologies, flat display devices having compact size and light weight with superior performance have been extensively used.

Among the flat display devices, a liquid crystal display (LCD) has advantages of compact size, light weight and low power consumption, so the LCD has been spotlighted as a substitute for a conventional cathode ray tube (CRT). Such an LCD is installed in various information processing appliances that require the display device.

In general, the LCD applies voltage to liquid crystal having specific molecular alignment to change the molecular alignment of the liquid crystal, and generates visual signals based on variation in optical characteristics of liquid crystal cells, such as double refraction, optical rotary power, dichroism, and light scattering characteristics. That is, the LCD displays information by performing light modulation using the liquid crystal cells that emit light according to the molecular alignment of the liquid crystal.

A liquid crystal display panel of the LCD is a non-emissive device, so a backlight unit is installed at a rear of the liquid crystal display panel to provide light to the liquid crystal display panel.

The backlight unit is classified into an edge-illumination type backlight unit and a direct-illumination type backlight unit according to a position of a light source thereof.

The edge-illumination type backlight unit includes a light source unit provided at a lateral side of a light guiding plate used for guiding light. The light source unit includes a lamp for generating light, a lamp holder provided at both sides of the lamp to protect the lamp, and a lamp housing that surrounds an outer peripheral surface of the lamp to reflect the light, which is generated from the lamp, toward a light guiding plate. The edge-illumination type backlight unit is employed in the LCD having a relatively small size, such as a monitor of a lap-top computer or a desk-top computer. The edge-illumination type backlight unit represents advantages in terms of light uniformity, endurance, and slimness of the LCD.

The direct-illumination type backlight unit is developed as the size of the LCD has been enlarged up to 20 inches. According to the direct-illumination type backlight unit, a plurality of lamps are provided below the liquid crystal display panel to directly illuminate light to the liquid crystal display panel. The direct-illumination type backlight unit has high light efficiency, so the direct-illumination type backlight unit is mainly employed in a large-size LCD requiring high brightness.

A light source unit provided in the direct-illumination type backlight unit includes a plurality of lamps, lamp sockets provided at both ends of the lamps to support the lamps while being electrically connected with electrodes provided at both ends of the lamps, a printed circuit board (PCB) electrically connected to the lamp sockets to receive a lamp driving signal from an exterior, and a plurality of condensers installed at both ends of the lamps on the PCB.

The condensers uniformly maintain a swing width of an AC (alternate current) signal input into both ends of the lamp.

The condensers may have tolerance and temperature coefficient, which vary according to the condensers. If the condensers have tolerance and temperature coefficient, which are different from each other, the swing width of the AC signal input into both ends of the lamp may not be uniformly maintained.

The condensers having various tolerance and temperature coefficient may cause tube current variation of the lamps, resulting in non-uniform brightness.

In addition, since the large-size LCD having the direct-illumination type backlight unit displays an image in a state in which the large-size LCD is uprightly positioned, the temperature may increase at the upper portion of the backlight unit due to convection phenomenon, so that brightness difference may occur between the upper and lower portions of the backlight unit. That is, the lamps provided at the upper portion of the backlight unit represent higher tube current as compared with that of the lamps provided at the lower portion of the backlight unit.

In detail, if the temperature of a conductor subject to the same voltage rises, resistance of the conductor decreases so that high current is applied to the conductor. Thus, the ambient temperature of the lamp becomes high, so that non-uniform brightness may occur.

In order to solve this problem, capacitance values of the condensers are finely adjusted depending on the lamps. However, since capacitance values of high-voltage condensers in use are set with few pF intervals, not only is it difficult to develop new high-voltage condensers having capacitance values with 0.1 pF interval, but also the new high-voltage condensers may cause the great manufacturing cost.

SUMMARY OF THE INVENTION

Accordingly, the present invention is directed to a liquid crystal display device that substantially obviates one or more of the problems due to limitations and disadvantages of the related art.

An object of the present invention is to provide a backlight unit capable of reducing tube current variation between lamps.

Another object of the present invention is to provide a backlight unit having uniform brightness and a liquid crystal display device having the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Figure 1:
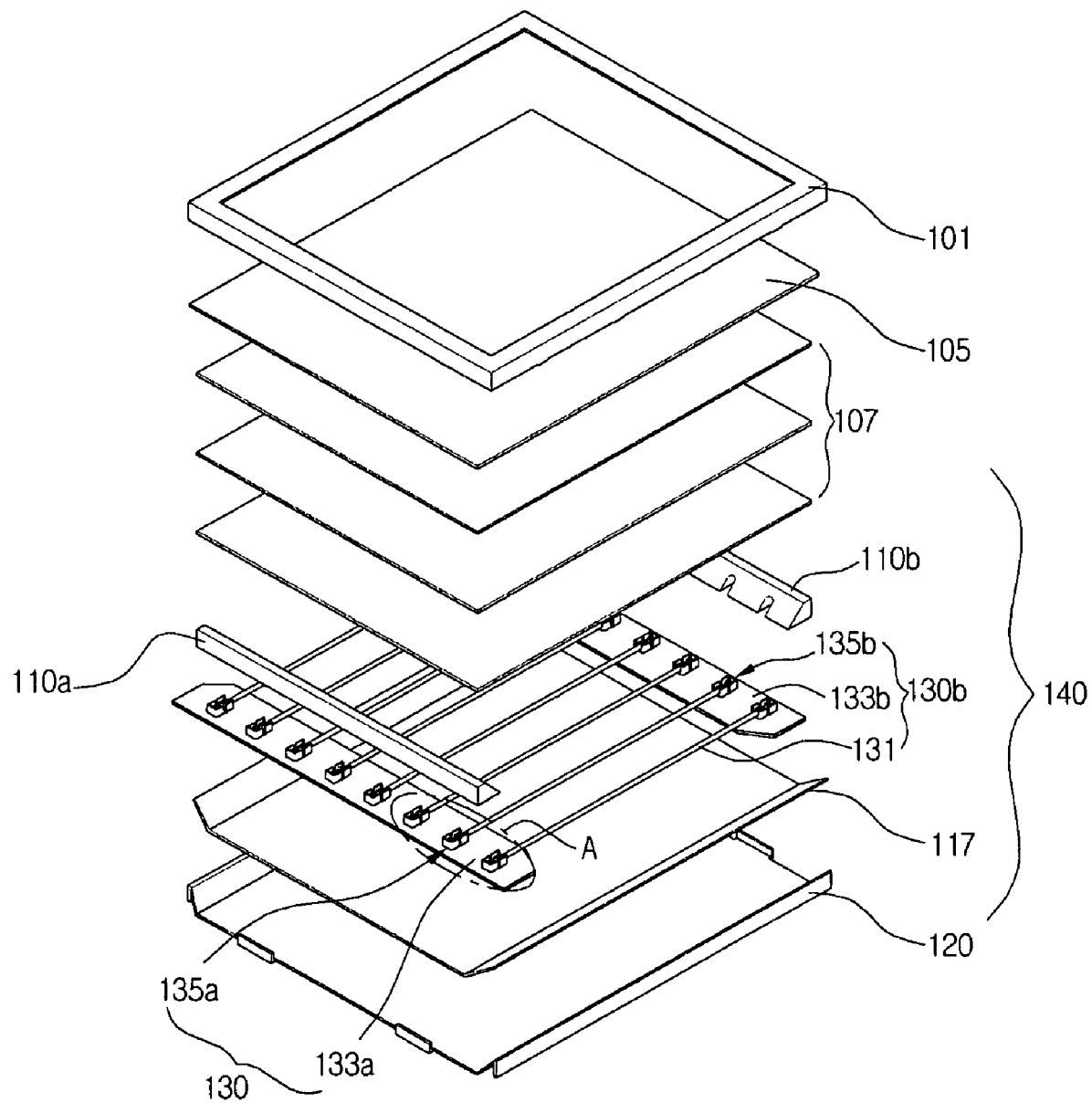
FIG. 1 is an exploded perspective view showing a direct-illumination type liquid crystal display device according to an embodiment of the present invention.
Figure 2:
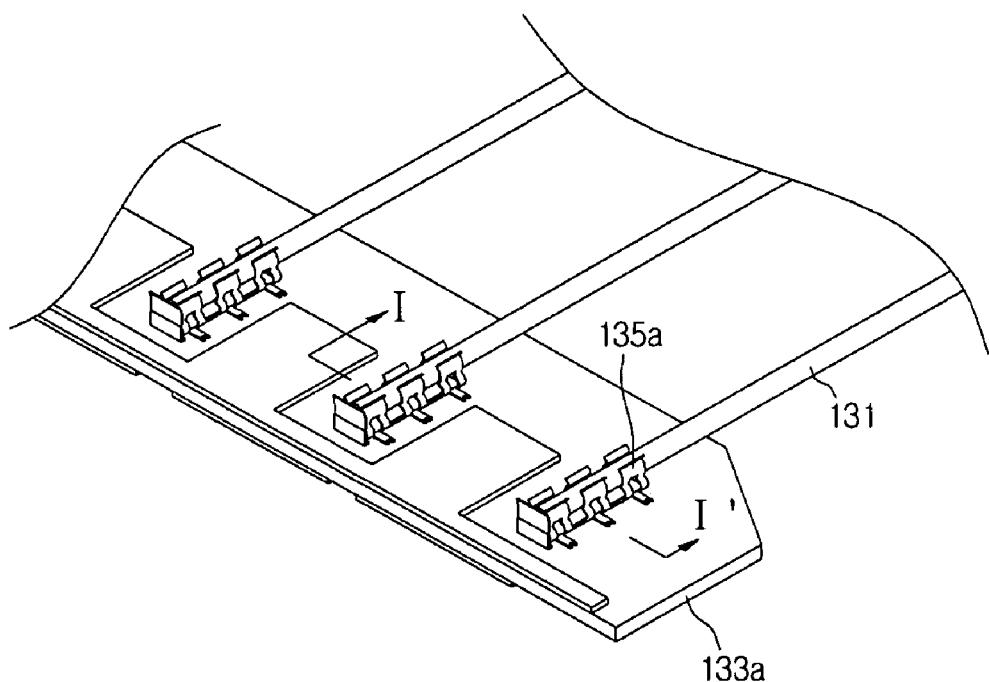
FIG. 2 is a detailed view of an A area shown in FIG. 1.
Figure 3:
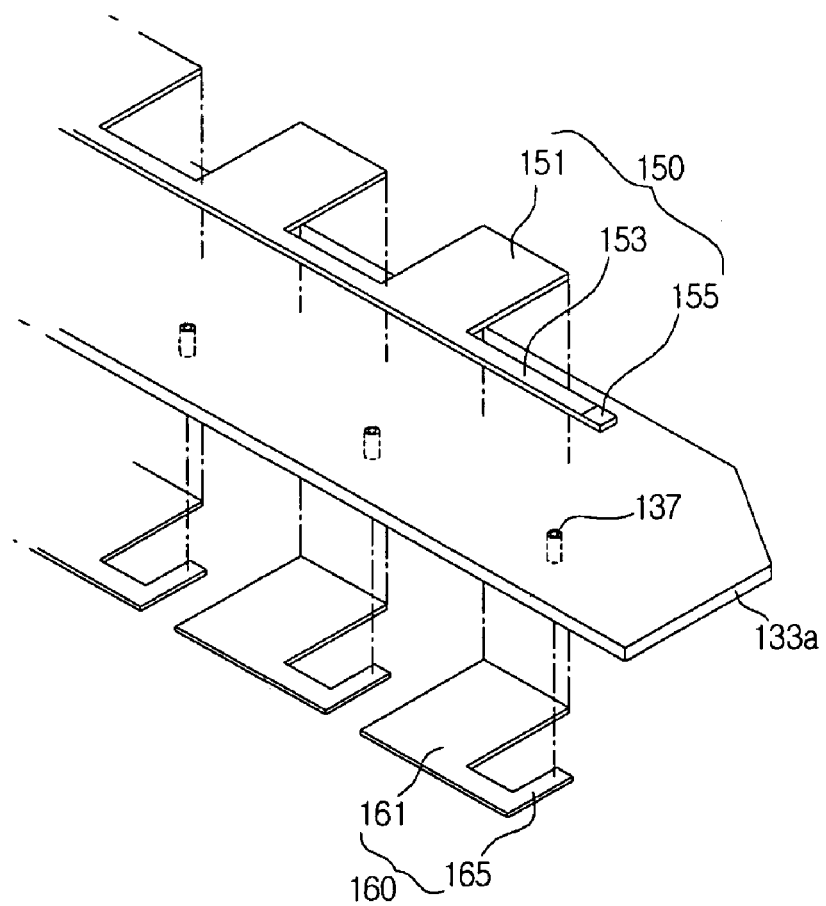
FIG. 3 is an exploded perspective view showing a substrate and first and second conductors illustrated in FIG. 2.

FIG. 1 is an exploded perspective view showing a direct-illumination type liquid crystal display device according to an embodiment of the present invention, FIG. 2 is a detailed view of an A area shown in FIG. 1, and FIG. 3 is an exploded perspective view showing a substrate of a light source unit and first and second conductors illustrated in FIG. 2.

As shown in FIG. 1, the direct-illumination type liquid crystal display device according to an embodiment of the present invention includes a liquid crystal display panel 105 displaying an image, a backlight unit 140 providing light to the liquid crystal display panel 105, and a top case 101 surrounding edges of the liquid crystal display panel 105 to integrally assemble the liquid crystal display panel 105 with the backlight unit 140.

Although not shown in detail, the liquid crystal display panel 105 includes a thin film transistor (TFT) array substrate, a color filter substrate, which is combined with the TFT array substrate such that a cell gap is uniformly formed therebetween, and a liquid crystal layer interposed between the TFT array substrate and the color filter substrate.

The backlight unit 140 includes a bottom cover 120 having a box shape with an open upper surface, a light source unit 130 having a plurality of lamps 131 arranged in the bottom cover 120 at a predetermined interval, and a lamp driving module (not shown) generating a driving signal for driving the lamps 131.

The backlight unit 140 also includes optical sheets 107, which are disposed above the light source unit 130 to diffuse and collect light, a reflective sheet 117 provided in the bottom cover 120 to reflect light generated from the lamps 131, and first and second support sides 110a and 110b, which are provided at both side ends of the light source unit 130 to protect the both side ends of the light source unit 130 and to support the optical sheets 107 such that a gap between the light source unit 130 and the optical sheets 107 can be constantly maintained.

Although not shown in detail, the optical sheets 107 may include a diffusion sheet for diffusing light, a collection sheet for collecting light, and a protective sheet for protecting the collection sheet.

The collection sheet is formed with a prism pattern or a pyramid pattern to collect the light diffused from the diffusion sheet.

The diffusion sheet may include one of plastic, such as polymethylmethacrylate (PMMA), resin, and flat type glass or wedge type glass.

The diffusion sheet is disposed on the first and second support sides 110a and 110b to support the collection sheet and the protective sheet. The reflective sheet 117 is disposed below the light source unit 130 so as to reflect the light, which is transmitted downward through the light source unit 130, toward the optical sheets 107.

The bottom cover 120 is made from a metallic material and is constructed in a box shape with an open upper surface to reinforce strength of the liquid crystal display device having a slim structure.

The light source unit 130 generating the light includes a plurality of lamps 131 arranged at a constant interval, first and second electrodes (not shown) provided at both ends of the lamps 131, a plurality of first and second lamp holders 135a and 135b for fixing the both ends of the lamps 131, and first and second substrates 133a and 133b electrically connected to the first and second lamp holders 135a and 135b.

The lamps 131 have tube shapes.

For instance, the lamps 131 include an external electrode fluorescent lamp (EEFL) having an external electrode or a cold cathode fluorescent lamp (CCFL).

The first and second substrates 133a and 133b are made from resin-based insulating material, such as epoxy.

Referring to FIGS. 2 and 3, a first conductor 150 is formed on a top surface of the first substrate 133a, on which a plurality of first lamp holders 135 are fixed, and a second conductor 160 is formed on a bottom surface of the first substrate 133a in correspondence with the first conductor 150. That is, the first and second conductors 150 and 160 are formed on the top and bottom surfaces of the first and second substrates 133a and 133b made from the insulating material to serve as capacitors. In other words, the first and second conductors 150 and 160, which are formed on the top and bottom surfaces of the first and second substrates 133a and 133b in opposition to each other, are defined as capacitors.

The first substrate 133a is formed with a plurality of contact holes 137 electrically connected to the first lamp holders 135a.

The reason for installing the first and second conductors 150 and 160 on the top and bottom surfaces of the first substrate 133a in opposition to each other is to utilize capacitance, which is generated between two conductors when voltage is applied to the conductors insulated from each other by an insulator. That is, the first and second conductors 150 and 160 are spaced apart from each other by a predetermined interval (which corresponds to the thickness of the first substrate).

The first conductor 150 includes first electrodes 151 disposed between first lamp holders 135a and prepared in the form of surface electrodes, a first connection bar 153 provided at end portions of the first electrodes 151 so as to electrically connect the first electrodes 151 to each other, and a pad 155 to which driving voltage is applied from an external lamp driving module (not shown) to drive the lamps 131. The first conductor 150 does not make contact with the first lamp holders 135a.

In addition, the first electrodes 151, the first connection bar 153 and the pad 155 are integrally formed with each other.

The second conductor 160 corresponds to the first conductor 150. In detail, the second conductor 160 includes second electrodes 161 prepared in the form of surface electrodes corresponding to the first electrodes 151, and second connection bars 165 electrically connected to the second electrodes 161, respectively.

The second connection bars 165 are bent and connected to end portions of the second electrodes 161.

The second connection bars 165 are electrically connected with contact holes 137a formed in the first substrate 133a, respectively.

The second electrodes 161 are integrally formed with the second connection bars 165.

Although not shown in the drawings in detail, the second substrate 133b (see, FIG. 1) has the structure identical to the structure of the first substrate 133a.

The present invention illustrates linear lamps 131 provided at both ends thereof with electrodes. However, the present invention is not limited thereto. For instance, the present invention may include a U-shape lamp in which only one substrate is provided at one end of the U-shape lamp. That is, the number of the substrates may vary depending on the type of the lamps.

In the light source unit 130 according to an embodiment of the present invention, driving voltage is applied to the pad 155 of the first conductor provided on the first and second substrates 133a and 133b to drive the lamps 131. If the driving voltage is applied to the pad 155, the insulator (substrate) interposed between the first electrodes 151 of the first conductor 150 and the second electrodes 161 of the second conductor 160 is converted into a dielectric substance so that capacitance C is generated. That is, the present invention uniformly maintains tube current of the lamps 131 by controlling the capacitance.

According to the above mentioned direct-illumination type liquid crystal display device, the first and second conductors 150 and 160 are provided on the top and bottom surfaces of the first and second substrates 133a and 133b in correspondence with each other, so that tube current variation of the lamps 131 can be reduced by controlling the capacitance generated between the first and second conductors 150 and 160. That is, the present invention can provide backlight unit having uniform brightness.

Figure 4:
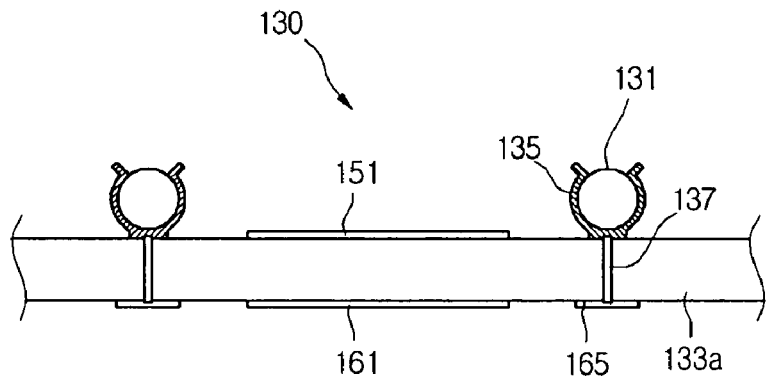
FIG. 4 is a sectional view taken along line I-I' of FIG. 2.

FIG. 4 is a sectional view taken along line I-I' of FIG. 2.

Since the structure of the light source unit has been described in detail with reference to FIGS. 1 to 3, it will not be further described below.

The fist lamp holders 135 for fixedly holding the lamps 131 of the light source unit 130 are electrically connected to the contact holes 137. The contact holes 137 are electrically connected to the second connection bars 165 integrally formed with the second electrodes 161.

If the driving voltage is supplied from the external lamp driving module, capacitance is generated due to the dielectric substance (substrate) interposed between the first and second electrodes 151 and 152, so that the light source unit 130 can uniformly maintain the tube current of the lamps 131 by controlling the capacitance.

$$C = \varepsilon \times \frac{S}{D} \quad \text{Equation 1}$$

In Equation 1, ∈ is a dielectric constant of the first substrate 133a, and S is a contact area between the first substrate 133a and the first and second electrodes 151 and 161. In addition, D is a distance between the first and second electrodes 151 and 161, which are aligned in opposition to each other while interposing the first substrate 133a therebetween.

According to the present invention, the first substrate 133a includes resin-based material, such as epoxy. The dielectric constant can be adjusted according to the materials for the first substrate 133a. That is, according to the present invention, the material for the first substrate 133a is changed according to the type and size of the liquid crystal display device such that the liquid crystal display device can represent optimum and uniform brightness.

In addition, different from the conventional liquid crystal display device, the liquid crystal display device according to an embodiment of the present invention does not require a plurality of high-voltage condensers to uniformly maintain the tube current of the lamps 131, so that the manufacturing cost can be reduced.

Figure 5:
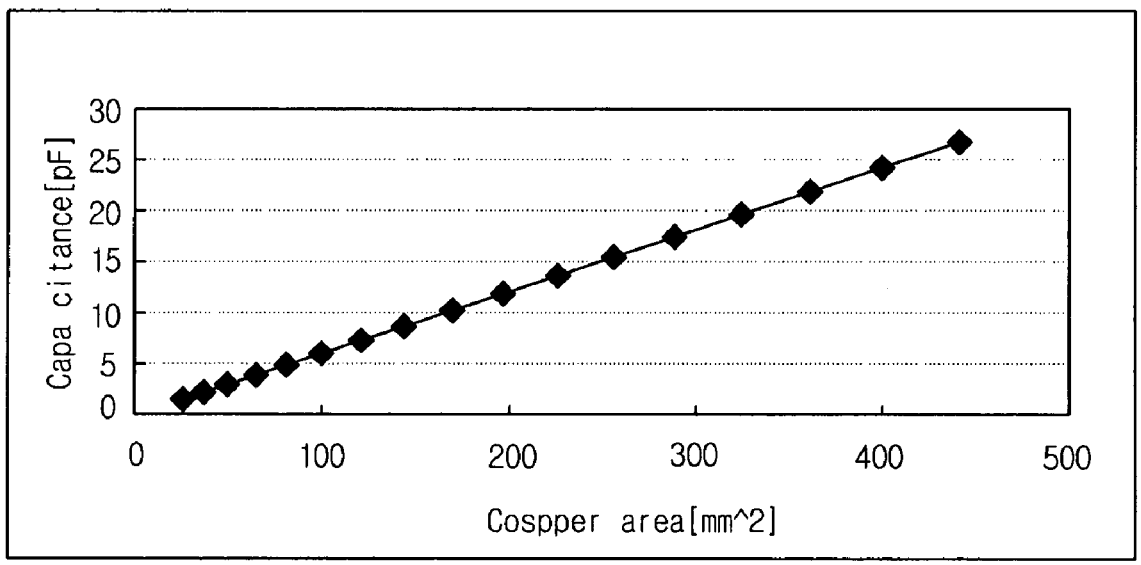
FIG. 5 is a view showing a test result of a light source unit according to an embodiment of the present invention.

FIG. 5 is a view showing a test result of the light source unit according to an embodiment of the present invention.

As shown in FIG. 5, the light source unit of the present invention includes the CCFL and is provided in the backlight unit having a size of 42 inches.

When the substrate has a thickness of about 0.8 mm, capacitance of the conventional high-voltage condenser is about 15 pF. In this regard, the capacitor of the present invention has an area of about 240 mm². That is, the first and second electrodes 151 and 161 (see, FIG. 4) have an area of about 240 mm², respectively, such that the first and second conductors have the capacitance of 15 pF.

FIGS. 6A to 6E are sectional views of a light source unit according to another embodiment of the present invention.

As shown in FIGS. 6A to 6E, the light source unit according to another embodiment of the present invention may have components identical to those of the light source unit according to an embodiment of the present invention, and description about the same components will be omitted below.

Figure 6A:
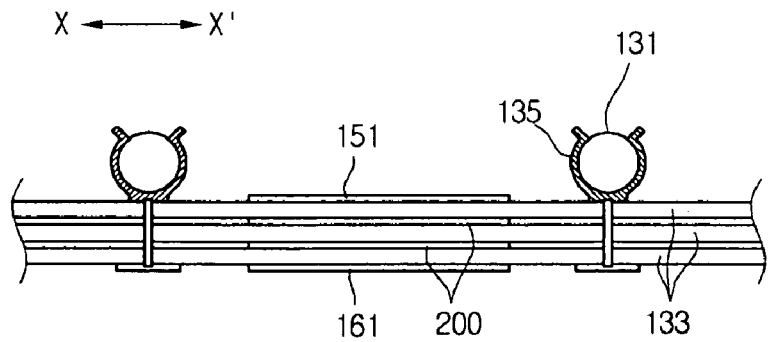
FIGS. 6A to 6E are sectional views of a light source unit according to another embodiment of the present invention.

Referring to FIG. 6A, first electrodes 151 are formed on a top surface of a substrate 133a where lamp holders 135a are provided to fixedly hold lamps 131 and second electrodes 161 are formed on a bottom surface of the substrate 133a.

At least one third electrode 200 is interposed between the first and second electrodes 151 and 161, and at least two substrates 133a are prepared.

The third electrode 200 increases the capacitance for uniformly maintaining the tube current of the lamps 131 when driving the light source unit. That is, the contact area between the substrate 133a and conductors (first to third electrodes 151, 161 and 200) can be enlarged and an interval between the conductors can be reduced due to the third electrode 200.

Figure 6B:
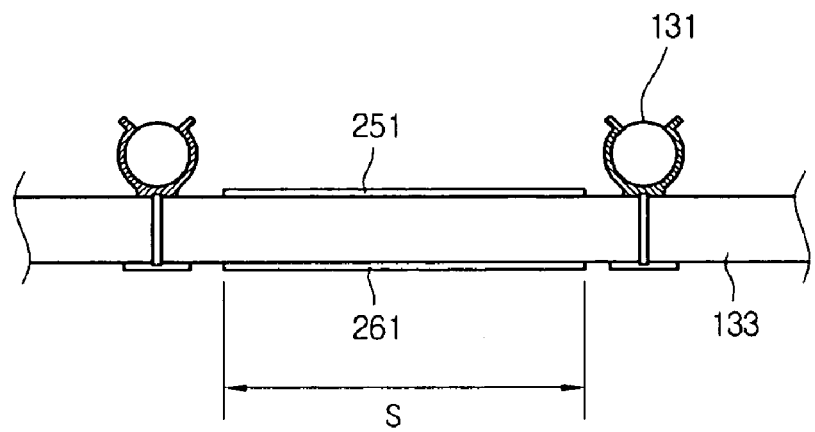

Referring to FIG. 6B, first and second electrodes 251 and 261 extend in the x-x' direction, so that the contact area S between the substrate 133a and conductors (first and second electrodes 251 and 261) is enlarged as compared with that of the light source unit according to one embodiment of the present invention described above. Although FIG. 6B shows the substrate 133a and the conductors (first and second electrodes 251 and 261), which extend in the x-x' direction to enlarge the contact area S therebetween, the present invention is not limited thereto. For instance, the first and second electrodes 251 and 261 can extend lengthwise along the lamps 131.

Figure 6C:
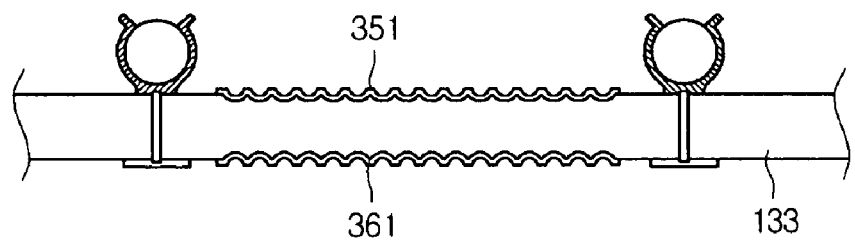

Referring to FIG. 6C, first and second electrodes 351 and 361 have corrugated shapes. That is, since the first and second electrodes 351 and 361 have corrugated shapes, the contact area between the substrate 133a and the conductors (first and second electrodes 351 and 361) can be enlarged.

Figure 6D:
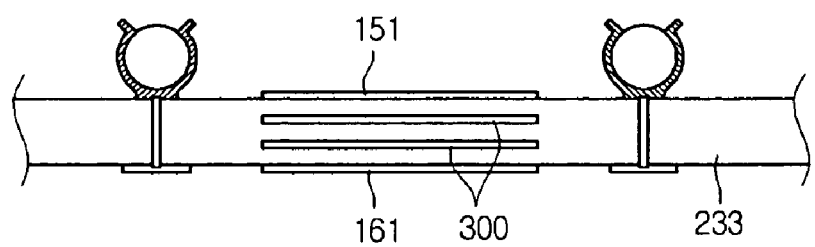

Referring to FIG. 6D, the first and second electrodes 151 and 161 are provided on the top and bottom surfaces of a substrate 233, respectively, and at least one third electrode 300 is provided in the substrate 233 between the first and second electrodes 151 and 161. The third electrode 300 can be formed during the manufacturing process for the substrate 233.

Figure 6E:
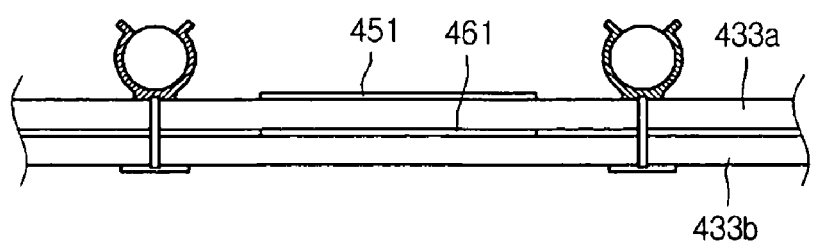

Referring to FIG. 6E, first electrodes 451 are formed on a first substrate 433a and second electrodes 461 are formed on a second substrate 433b. The first and second substrates 433a and 433b are combined with each other such that the first electrodes 451 can correspond to the second electrodes 461.

As described, the light source unit according to another embodiment of the present invention can control the capacitance by enlarging the contact area S or reducing the interval between the substrates 133a, 233, 433a and 433b and conductors (first to third electrodes 151, 161, 200, 251, 261, 300, 351, 361, 451, and 461).

Therefore, according to the present invention, the interval and the contact area between the substrate 133a and the conductors (first to third electrodes 151, 161, 200, 251, 261, 351, and 361) or the material for the substrate 133a can be changed according to the internal temperature of the liquid crystal display device which displays images in an upright position, so that the liquid crystal display device can display images having uniform brightness.

As described above, according to the present invention, conductors are formed on the top and bottom surfaces of the substrate, to which the lamp driving signal is applied, so that the tube current variation between the lamps can be reduced by controlling the capacitance generated between the conductors which are positioned corresponding to each other.

In addition, according to the present invention, the tube current variation between the upper lamps having the relatively high temperature and the lower lamps having the relatively low temperature can be reduced by controlling the internal temperature of the liquid crystal display device which displays images in an upright position, so that the liquid crystal display device can display images having uniform brightness even if temperature variation occurs in the liquid crystal display device.

Further, the present invention can uniformly maintain the tube current of the lamps without using a plurality of high-voltage condensers, so that the manufacturing cost for the liquid crystal display device can be reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A backlight unit comprising:
a plurality of lamps provided at both ends thereof with electrodes and having a tubular shape;
a plurality of lamp holders for fixing the both ends of the lamps;
at least one substrate on which the lamp holders are mounted; and
at least two conductors formed on the substrate in opposition to each other to generate capacitance for uniformly maintaining tube current of the lamps,
wherein the conductors include a first conductor formed on a top surface of the substrate and a second conductor formed on a bottom surface of the substrate.

2. The backlight unit as claimed in claim 1, further comprising a plurality of contact holes formed through the substrate, wherein the second conductor makes contact with the contact holes and the lamp holders are electrically connected with the contact holes.

3. The backlight unit as claimed in claim 2, wherein the first conductor includes a plurality of first electrodes serving as surface electrodes, a first connection bar for connecting the first electrodes to each other, and a pad provided at an end portion of the first connection bar to receive a driving signal from an exterior to drive the lamps, and the second conductor includes second electrodes serving as surface electrodes corresponding to the first electrodes, and second connection bars making contact with the contact holes, respectively.

4. The backlight unit as claimed in claim 3, wherein the first electrodes, the first connection bar and the pad are integrally formed with each other.

5. The backlight unit as claimed in claim 3, wherein the second electrodes are integrally formed with the second connection bars.

6. The backlight unit as claimed in claim 3, wherein the first electrodes have an area identical to an area of the second electrodes.

7. The backlight unit as claimed in claim 3, wherein the first and second electrodes have a corrugated shape.

8. The backlight unit as claimed in claim 1, further comprising at least one third conductor interposed between the first and second conductors.

9. The backlight unit as claimed in claim 1, wherein the substrate includes a multi-layer substrate and at least one third conductor is interposed between layers of the substrate.

10. A liquid crystal display device comprising:
a plurality of lamps provided at both ends thereof with electrodes and having a tubular shape;
a plurality of lamp holders for fixing the both ends of the lamps;
at least one substrate on which the lamp holders are mounted;
at least two conductors formed on the substrate in opposition to each other to generate capacitance for uniformly maintaining tube current of the lamps; and
a liquid crystal display panel disposed above the lamps to display images by using light generated from the lamps,
wherein the conductors include a first conductor formed on a top surface of the substrate and a second conductor formed on a bottom surface of the substrate.

11. The liquid crystal display device as claimed in claim 10, further comprising a plurality of contact holes formed through the substrate, wherein the second conductor makes contact with the contact holes and the lamp holders are electrically connected with the contact holes.

12. The liquid crystal display device as claimed in claim 11, wherein the first conductor includes a plurality of first electrodes serving as surface electrodes, a first connection bar for connecting the first electrodes to each other, and a pad provided at an end portion of the first connection bar to receive a driving signal from an exterior to drive the lamps, and the second conductor includes second electrodes serving as surface electrodes corresponding to the first electrodes, and second connection bars making contact with the contact holes, respectively.

13. The liquid crystal display device as claimed in claim 12, wherein the first electrodes, the first connection bar and the pad are integrally formed with each other.

14. The liquid crystal display device as claimed in claim 12, wherein the second electrodes are integrally formed with the second connection bars.

15. The liquid crystal display device as claimed in claim 12, wherein the first electrodes have an area identical to an area of the second electrodes.

16. The liquid crystal display device as claimed in claim 12, wherein the first and second electrodes have a corrugated shape.

17. The liquid crystal display device as claimed in claim 10, further comprising at least one third conductor interposed between the first and second conductors.

18. The liquid crystal display device as claimed in claim 10, wherein the substrate includes a multi-layer substrate and at least one third conductor is interposed between layers of the substrate.

* * * * *